United States Patent Office 3,222,725
Patented Dec. 14, 1965

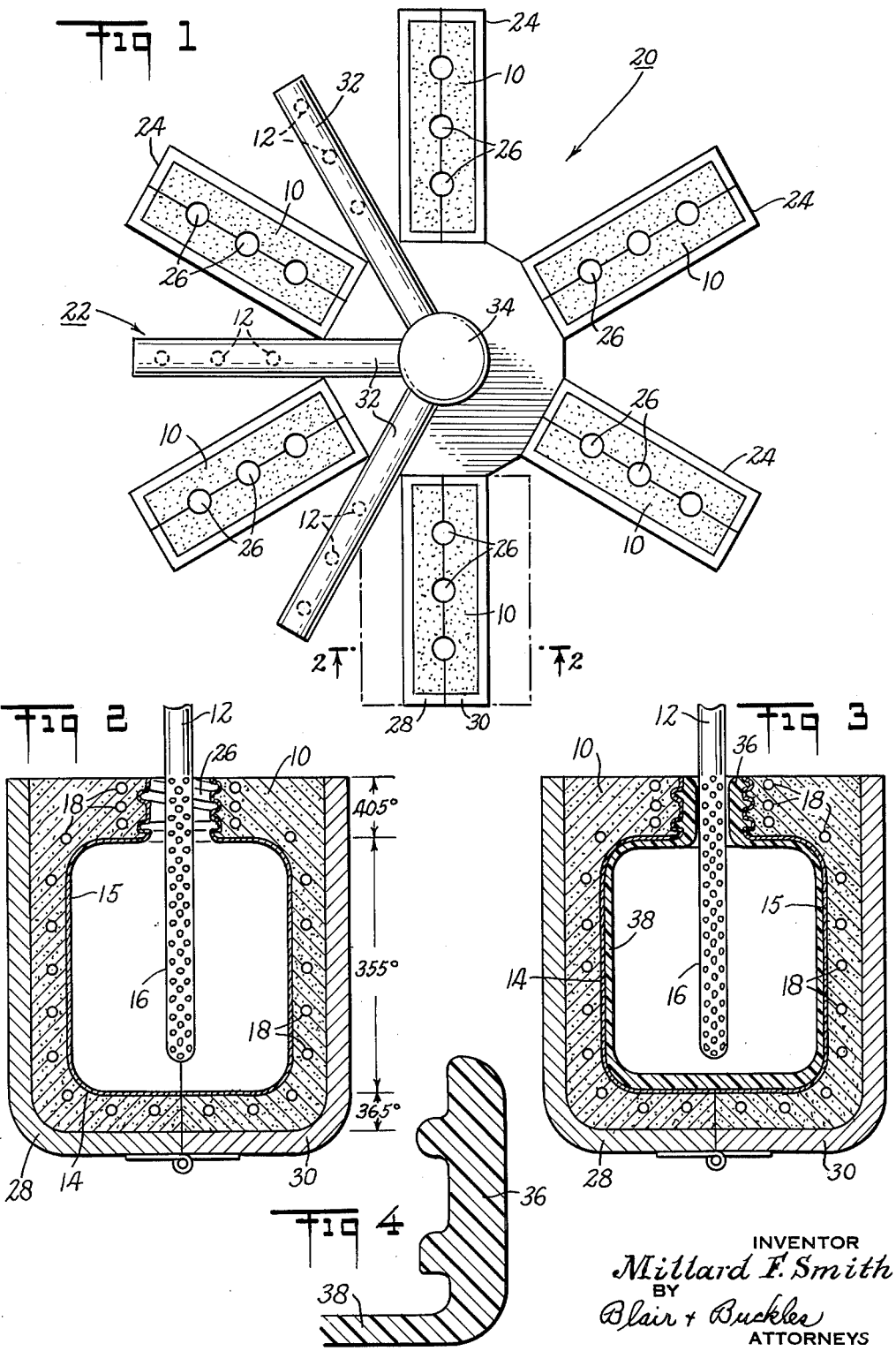

3,222,725
MOLDING PROCESS AND APPARATUS
Millard F. Smith, Westport, Conn. (% Neirad Industries, Inc., P.O. Box 295, Saugatuck, Conn.)
Filed Oct. 25, 1961, Ser. No. 147,668
4 Claims. (Cl. 18—26)

This invention relates to molding, and more particularly to molding such material as powdered polyethylene or other plastics into bottles or other hollow articles, especially those requiring varied wall thicknesses for maximum strength and rigidity.

In the past, hollow articles, such as bottles, jars, doll heads and body components, squeeze toys, collapsible squeeze tubes, boots, finger cots, baby dishes and the like were generally made by two methods; namely, blow molding and plastisol molding.

Blow molding generally employs one of three basic techniques. In the first technique, molten plastic granules are extruded in the form of a hollow tube. As the tube is extruded, two mold halves are clamped around the tube, sealing one end. The clamped hollow tube is then inflated through the open end to expand it against the cored surface of the mold cavity. After cooling, the mold halves are opened and the hollow molded item is removed from the machine. In the second technique, a preform is first made by injection molding and then blown to its final shape while enclosed within a heated mold. In the third technique, sheet material is formed by vacuum or pressure forming into half sections of the desired hollow item. These halved sections are then sealed together.

Plastisol molding of hollow items also employs one of three basic techniques: namely, dip molding, slush molding and rotational casting.

In dip molding, a full scale model of the desired hollow item is dipped into a plastisol bath. The plastisol coating remaining on the mold is then fused or fluxed to solidify it. Subsequently, the solidified coating is skinned-back off the mold to form the finished item. In slush molding, a preheated hollow mold is filled with plastisol. The heat gels the material which is adjacent to the mold walls. Excess liquid plastisol is removed by pouring it off. The gelled wall structure is then removed by vacuum or by opening the mold. In this technique, the wall thickness of the gelled plastisol is controlled by the temperature to which the mold has been preheated, and by the length of dwell time of the liquid plastisol within the mold before being dumped. In rotational molding, a predetermined amount of plastisol is introduced into one-half of a two-part mold. After the other half has been clamped thereto, the assembled mold is rotated in two planes while it is heated. This gels or fuses a film of plastisol on the entire interior surface to form a hollow object whose surface approximates the inside surface of the mold.

In all of the above techniques, it is very difficult to control the uniformity of wall thickness. An even more difficult feat, with these methods, is to manufacture an article having predetermined different wall thicknesses so as to maximize strength and rigidity in certain areas of the molded article.

Accordingly, a principal object of this invention is to provide a novel molding process for producing hollow articles with excellent control over wall thickness.

Another object is to provide a molding process of the above character which can produce hollow molded articles of predetermined non-uniform wall thickness.

Still another object is to provide a molding process which is relatively simple, inexpensive and easy to control.

A further object is to provide a novel molding process of the above character having very little, if any, waste by reason of flash, runners, gates or the like, normally inherent in the molding process.

Another object is to provide novel apparatus for effecting this simple molding process.

A further object is to provide apparatus of the above character which is adapted for continuous operation.

Another object is to provide apparatus of the above character which is relatively simple and economical to manufacture.

Other objects of the invention will in part be obvious and will in part appear hereinafter.

The invention accordingly comprises the several steps and the relation of one or more of such steps with respect to each of the others and the apparatus embodying features of construction, combinations of elements, and arrangements of parts which are adapted to effect such steps, all as exemplified in the following detailed disclosure, and the scope of the invention will be indicated in the claims.

For a fuller understanding of the nature and objects of the invention, reference should be had to the following detailed description, taken in connection with the accompanying drawings, in which:

FIGURE 1 is a top view of the apparatus for use with the process of this invention;

FIGURE 2 is a cross-sectional view of one bottle mold in one arm of the apparatus of FIGURE 1, taken along line 2—2;

FIGURE 3 is a similar detailed cross-sectional view showing a delivery tube inserted into the mold and spraying material onto the walls of the temperature-controlled mold cavity; and FIGURE 4 is a partial cross-sectional view of a molded bottle showing the varied wall thickness that can be accomplished by the method of this invention.

Similar reference characters refer to similar parts throughout the several views of the drawings.

In accordance with the objects enumerated above, the novel method and apparatus of this invention involves spraying a finely divided thermosettable or thermoplastic fluid material, such as powdered polyethylene or polyvinyl chloride suspended in a flowing stream of gas, onto a surface having one or more predetermined temperature-controlled zones. These zones may be either heated or chilled, depending upon the material being used for molding. In one form of apparatus, as shown in FIGURE 2, the apparatus includes at least one cavity mold 10, into which one or more delivery tubes 12 are inserted sequentially. Solidifiable materials, such as liquid or powdered dry thermoplastic or thermosetting resins, plastisols, or molten metals, are conducted through these delivery tubes, to be sprayed through nozzles toward the walls of the cavity mold. Since the cavity walls 14 are either heated or cooled to different degrees in different areas, such application of heat or cold solidifies the sprayed material to different thicknesses. Hence, by proper positioning of the nozzle 16 in the delivery tube and the heating or cooling coils 18 in the walls of the cavity mold, a molded item can be formed which has accurately positioned differing wall thicknesses. It is also possible, by this method, to mold articles with varying color tones, or varying wall material having different tensile strengths, differing resilience, and the like.

The refined embodiment of this invention involves a table 20 containing a plurality of molds. A series of delivery tubes 12, mounted on a rotatable rack 22 are inserted sequentially into these cavity molds. By proper indexing with a control system, a main layer, one or more intermediate layers and a finish layer can be sprayed onto the mold walls, controlling the physical characteristics of the end product.

MOLD APPARATUS

Reference is now made to FIGURE 1, for a detailed description of the refined embodiment of the invention. As indicated, it basically consists of a table 20 with radial arms 24. Each arm contains a plurality of cavity molds 10. Each cavity mold is preferably formed as follows:

*Making of the cavity mold.*—While there are several techniques for making the cavity mold, the preferred one for this invention first involves sculpturing a pattern or full-size prototype of the article out of soluble material, such as plaster-of-Paris. The plaster-of-Paris pattern is then plated with a metal, such as copper, forming a plating layer 15 having a thickness of about 10 mils. The metal-plated pattern is then positioned within a container and heating or cooling coils are positioned around the pattern, with their spacing depending upon the eventual heating or cooling action desired in the cavity mold. A potting or embedding composition is flowed into the container, surrounding the heating or cooling coils and enclosing the plated pattern. After the potting composition has set, the outer container is removed and the entire potted assembly is slit in half. Afterwards, the plaster-of-Paris model is washed out with hot water to form two halves of an interior copper-clad cavity mold with heat or cooling coils embedded in its wall surfaces.

As indicated above, the density or spacing of the heating or cooling coils prior to potting depends upon the desired physical attributes in the article to be molded. As will be seen from the further description of this invention, the coils must be so positioned that they will advance or retard the rate of solidification of the fluid material as it is sprayed onto the walls of the cavity mold. For example, in FIGURE 2, the middle or wall portion of the bottle cavity mold is shown with fewer heating coils than the neck portion. A lower solidification temperature shown as 355° F., will therefore be attained in this location. The neck contains a greater number of coils so that a higher solidification temperature, such as 405° will be attained. Similarly, the base has an intermediate density of coils so that a temperature of 365° will be reached. Hence, varied zones of heating and/or cooling will be created in the walls of the cavity mold, and a molded article will thus be easily formed with wall thicknesses which are preferably greater at the greatest points of wear, where higher mold-wall temperatures fuse thicker coatings of the sprayed material. At the lower temperature zones, unfused powdered material can be recovered by suitable vacuum scavenging systems (not shown).

*The molding table.*—After a plurality of cavity molds have been manufactured as described above, they are formed into a hinged or slidably opening booklike mold with an upper aperture 26 for insertion of delivery tubes 12. Each mold contains two abutting facing "leaves" 28 and 30 which are separable for simplifying removal of the molded article. In an alternative variation, the cavity mold walls may be left solid, in which case the article is removed by drawing the molded article out through its own interior by such means as the application of a partial vacuum to the aperture 26.

The plurality of cavity molds are then fitted into the several arms 24 of the table 20. To permit accurate determination of the amount of material squirted into each cavity mold, each arm may be supported on a balance actuating suitable metering limiting switches.

*The rotatable rack.*—The rotatable rack 22 contains a plurality of arms 32 extending radially outward from the hub 34. The hub, in the embodiment shown, is preferably positioned at the center of the table 20 for proper alignment with all sets of molds 10.

The rotatable rack 22 is operatively connected to a piston (not shown) to effect vertical reciprocal movement. By proper sequencing through a control system (not shown), the rack is rotated relative to the table. When the delivery tubes are positioned over the openings of the cavity molds 10, the rack is moved downwardly. The tubes 12 enter the cavity molds through apertures 26 (see FIGURE 2). The control system then actuates one or more valves to cause ejection of thermosettable material through the nozzles 16 of the delivery tubes 12.

It should be noted that the nozzles in each delivery tube may be "bunched" or grouped in a pattern to effect greater application of material to one area of the cavity mold 10. This "bunching" is particularly helpful where out-of-round, or square objects are being molded.

*The process.*—The process effected by the apparatus just described may be generically described as one wherein finely divided liquid or powdered fluidized solid thermosolidifiable material is directed onto the walls of a cavity mold. In the embodiment shown, the walls of the mold are heated or cooled to differing degrees in different predetermined zones so that an uneven deposition of material will be effected. By properly positioning the differing zones of heated or chilled surfaces, one can form a molded article having predetermined varied wall thickness. Such a molded item is illustrated in FIGURE 4, wherein a hollow bottle has been molded with a neck and thread portion 36 thicker than walls 38 of the bottle.

The thermosolidifiable material that can be used may be any of the thermoplastic or thermosetting resins now available. Typical examples of thermoplastics are polyethylene, polypropylene, ethyl cellulose, cellulose acetate, cellulose proprionate, cellulose acetate-butyrate, polyvinyl chloride, polyvinylindene chloride, polyvinyl acetate, the polyacrylates, the polystyrenes, the nylons, the fluorocarbons and mixtures. Examples of the thermosetting plastics and resins are the plastisols, the melamines, the ureas, the polyesters, the alkyds, the epoxies, the phenolics and mixtures. When finely divided, powdered plastic coating materials are directed toward the molding surface in a flowing stream of gas, laminar flow is preferred and produces a coating of uniform thickness in many instances. The thermosolidifiable material may also be molten metal such as copper, lead, zinc, tin and others.

*Process and apparatus variations.*—Variations in processing can also be effected. For example, a sequential delivery tube insertion technique can be used with a preliminary coating, an intermediate layer, and a finish coating. This stepwise coating provides a better control over wall thickness in certain instances.

Another variation involves the application of different thermosolidifiable material by each different arm 32 of the rack 22. Alternatively, the same material, formulated with different melt indices, could be used. An apparatus variation would involve rotating each delivery tube during ejection so that a more uniform application of material is effected.

Another apparatus variation involves the use of a molding surface other than the interior of a cavity mold. Flat sheets, boxes, tubes and the like can be made using the temperature controlled molding surface of this invention.

It will thus be seen that the objects set forth above, among those made apparent from the preceding description, are efficiently attained and since certain changes may be made in carrying out the above process and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Apparatus for forming articles with a solidifiable material comprising in combination
   A. a mold whose surface conforms to the desired shape of said article,
   B. a material depositor directing a flowing stream of gas carrying suspended therein finely divided solidifiable material toward said mold surface, and movable into a fixed delivery position near the mold surface, and
   C. a plurality of independent temperature control means each disposed in a high heat transfer relation with a different selected portion of said mold surface to control the temperature of selected portions of said mold surface independently
       (1) and thereby control independently the thickness of said material fusing and solidifying on different ones of said selected portions of said mold surface.

2. Apparatus for making molded articles having different predetermined wall thicknesses comprising
   A. a mold having a molding surface
   B. a plurality of independent temperature control means each embedded in the mold adjacent to a different selected portion of the molding surface for independently varying the temperature of the surface in different ones of said selected portions of the molding surface,
   C. and means to deliver finely divided solidifiable material suspended in a flowing stream of gas toward the molding surface, including
       (1) a stream delivery conduit movable into a fixed delivery position near the molding surface
       (2) and orifice means communicating with the conduit and directing the stream toward the molding surface when the conduit is in its delivery position.

3. The apparatus defined in claim 2 in which the mold is a hollow cavity mold with an inner wall forming the molding surface, with the orifice means being positioned inside the hollow mold when the conduit is in its delivery position.

4. The apparatus defined in claim 3 wherein the orifice means comprise spray nozzles formed in the delivery conduit.

References Cited by the Examiner

UNITED STATES PATENTS

| | | | |
|---|---|---|---|
| 1,193,883 | 8/1916 | Emery | 18—58.4 |
| 1,554,986 | 9/1925 | Bulley | 18—47 |
| 1,990,260 | 2/1935 | West | 18—26 |
| 2,028,798 | 1/1936 | Murch. | |
| 2,246,332 | 6/1941 | Whiteley | 18—58 |
| 2,285,370 | 6/1942 | Staelin | 264—309 X |
| 2,317,597 | 4/1943 | Ford et al. | 18—38 |
| 2,318,377 | 5/1943 | Crowley | 18—38 |
| 2,337,036 | 12/1943 | Erdle | 18—47 |
| 2,451,992 | 10/1948 | Te Grotenhius | 18—38 |
| 2,464,082 | 3/1949 | Hart | 18—58 |
| 2,495,402 | 1/1950 | Bentson | 22—195 |
| 2,587,722 | 3/1952 | Garratt et al. | 118—317 X |
| 2,588,571 | 3/1952 | Porter | 18—58 |
| 2,642,034 | 6/1953 | Griffin et al. | 118—317 |
| 2,810,928 | 10/1957 | Raiche | 18—5 |
| 2,880,468 | 4/1959 | Mooney et al. | 18—26 |
| 2,947,046 | 8/1960 | Wiedmann | 22—195 |
| 2,951,261 | 9/1960 | Sherman | 18—5 |
| 2,959,820 | 11/1960 | Miller et al. | 18—58.3 |

FOREIGN PATENTS 836,758   6/1960   Great Britain.

WILLIAM J. STEPHENSON, *Primary Examiner.*

MICHAEL V. BRINDISI, *Examiner.*